US010278461B2

(12) United States Patent
Jacobs et al.

(10) Patent No.: US 10,278,461 B2
(45) Date of Patent: May 7, 2019

(54) LED CHARM BRACELET

(71) Applicant: Edward Jacobs, Hauppauge, NY (US)

(72) Inventors: Edward Jacobs, Hauppauge, NY (US); Marcel Botha, New York, NY (US)

(73) Assignee: Edward Jacobs, Hauppauge, NY (US)

(*) Notice: Subject to any disclaimer, the term of this patent is extended or adjusted under 35 U.S.C. 154(b) by 389 days.

(21) Appl. No.: 15/097,876

(22) Filed: Apr. 13, 2016

(65) Prior Publication Data
US 2016/0374439 A1 Dec. 29, 2016

Related U.S. Application Data

(60) Provisional application No. 62/146,680, filed on Apr. 13, 2015, provisional application No. 62/185,992, filed on Jun. 29, 2015.

(51) Int. Cl.
A44C 5/00 (2006.01)
A44C 5/20 (2006.01)
(Continued)

(52) U.S. Cl.
CPC ........ *A44C 15/0015* (2013.01); *A44C 5/0007* (2013.01); *A44C 5/208* (2013.01); *A44C 25/007* (2013.01); *F21L 4/00* (2013.01); *F21V 3/04* (2013.01); *F21V 33/0008* (2013.01); *H02J 7/0013* (2013.01); *A44C 13/00* (2013.01); *A44D 2203/00* (2013.01); *F21Y 2115/10* (2016.08)

(58) Field of Classification Search
CPC ... A44C 15/0015; A44C 5/0007; A44C 5/208; A44C 25/007; F21L 4/00; F21V 3/04; F21V 33/0008; H02J 7/0013
See application file for complete search history.

(56) References Cited

U.S. PATENT DOCUMENTS 5,321,593 A * 6/1994 Moates ................. F21S 10/00
362/227
2004/0201997 A1 10/2004 Chan
(Continued)

FOREIGN PATENT DOCUMENTS

CN 2819882 9/2006
CN 203608937 5/2014
(Continued)

OTHER PUBLICATIONS

International Search Report PCT/ISA/210, International Application No. PCT/US/2016/027287, pp. 1-12, International Filing Date Apr. 13, 2016, dated Oct. 18, 2016.
(Continued)

*Primary Examiner* — Thomas M Sember
(74) *Attorney, Agent, or Firm* — Bond Schoeneck & King, PLLC; George McGuire

(57) ABSTRACT

Present disclosure is directed to inventive methods and systems for providing electrical power to one or more charms operatively connected to an electrically powered jewelry. Accordingly, various embodiments are directed to a bracelet having at least a first and a second powered rail, the first rail having an electric potential lower than the second the rail such that a potential difference exists between the rails. In an embodiment, the first and second rails exists form an open circuit that may be closed by attaching one or more charms.

22 Claims, 12 Drawing Sheets

(51) Int. Cl.
*F21L 4/00* (2006.01)
*F21V 3/04* (2018.01)
*H02J 7/00* (2006.01)
*A44C 13/00* (2006.01)
*A44C 15/00* (2006.01)
*A44C 25/00* (2006.01)
*F21V 33/00* (2006.01)
*F21Y 115/10* (2016.01)

(56) References Cited

U.S. PATENT DOCUMENTS

2006/0133066 A1* 6/2006 D'Souza ............ A44C 15/0015
362/103
2009/0044566 A1 2/2009 Underdown et al.
2013/0317839 A1 11/2013 Creswell et al.
2014/0108031 A1 4/2014 Ferrara

FOREIGN PATENT DOCUMENTS

| DE | 102011054072 A1 | 4/2013 |
| EP | 2367340 A1 | 9/2011 |
| JP | 2004254981 * | 9/2004 |
| JP | 2004254981 A | 9/2004 |
| JP | 2004254987 | 9/2004 |
| WO | 2014/204979 | 12/2014 |

OTHER PUBLICATIONS

International Search Report PCT/ISA/210, International Application No. PCT/US/2016/027287, pp. 1-7 International Filing Date Jul. 1, 2016, dated Sep. 22, 2016.

International Search Report Form EPO Form 1507S, International Application No. PCT/US2016027287, pp. 1-9, International Filing Date Apr. 13, 2016, dated Oct. 17, 2018.

* cited by examiner

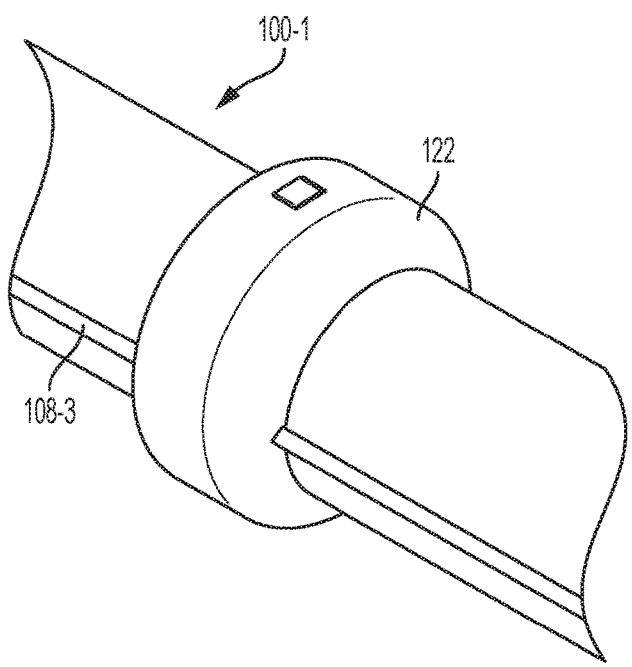
FIG. 10A
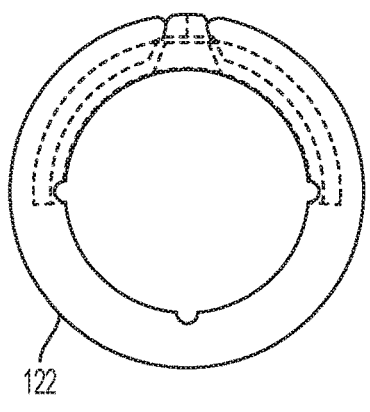 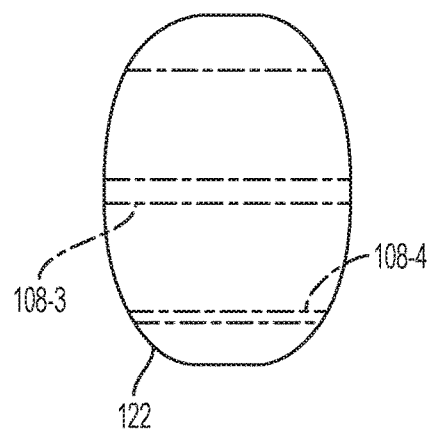
FIG. 10B  FIG. 10C

LED CHARM BRACELET

REFERENCE TO RELATED APPLICATION

The present application relates and claims priority to U.S. Provisional Application, Ser. No. 62/146,680, filed Apr. 13, 2015, also to U.S. Provisional Application, Ser. No. 62/185,992, filed Jun. 29, 2015 the entirety of which are hereby incorporated by reference.

FIELD OF INVENTION

The invention relates to jewelry generally, and specifically to jewelry configured to provide power to one or more decorative charms.

BACKGROUND

Charm bracelets have become nearly ubiquitous in the jewelry industry. Indeed, charm bracelets may be found at almost all retailers of jewelry. A recent charm bracelet manufacturer debuted in the stock market to a value of 6.1 billion dollars—evidencing the demand for charm bracelets worldwide.

Charm bracelets are attractive to consumers because they offer the opportunity to customize the bracelet over time through the addition of charms. These charms may have sentimental value, marking special occasions, or serving as mementos or souvenirs. However, innovation in the charm bracelet market has largely stagnated in recent years—charm bracelets are only offered in one or two forms. More specifically, as technology has become increasingly powerful, charm bracelets, and the jewelry market as a whole, have failed to follow suit. Accordingly, there is a need in the art to integrate electronics into jewelry such as charm bracelets.

SUMMARY OF THE INVENTION

In light of the above, the present disclosure is directed to inventive methods and systems for providing electrical power to one or more charms operatively connected to an electrically powered bracelet. Accordingly, various embodiments are directed to a bracelet having at least a first and a second powered rail, the first rail having an electric potential lower than the second rail such that a potential difference exists between the rails. In an embodiment, the first and second rails form an open circuit that may be closed by attaching one or more charms.

According to an aspect, a bracelet comprises a battery having a first terminal and a second terminal; a first conductive rail in electrical communication with the first terminal of the battery; a second conductive rail in electrical communication with the second terminal of the battery, such that a voltage exists between the first conductive rail and the second conductive rail; an exterior surface configured to attachably receive an electrical component such that the electrical component is in contact with and receives power from the first conductive rail and the second conductive rail.

According to an embodiment, the electrical component is a light emitting diode and the received power is sufficient to activate the light emitting diode.

According to an embodiment, the first rail is disposed within a first channel defined by the exterior surface and the second rail is disposed within a second channel defined by the exterior surface.

According to an embodiment, the first conductive rail and the second conductive rail each comprise an electrically conductive O-ring.

According to an embodiment, the first conductive rail and the second conductive rail each comprise a rigid electrically conductive piping.

According to an embodiment, the first conductive rail and the second conductive rail are each disposed on the exterior surface.

According to an embodiment, the first conductive rail and the second conductive rail are disposed on a knuckle defined by the exterior surface.

According to an embodiment the bracelet further comprises a magnetic clasp.

According to an embodiment, the exterior surface is defined by a self-healing rubber.

According to an embodiment, the bracelet further comprises an interface point configured to communicate with an external computing device.

According to an embodiment, the interface point comprises an antenna configured to transmit and receive at a frequency suitable for short-range communication.

According to an embodiment, the bracelet further comprises a casing configured to at least partially enclose the knuckle defined by the exterior surface.

According to an embodiment, the casing further comprises a light guide configured to diffuse light generated by the electrical component.

According to an embodiment, the first conductive rail and the second conductive rail are disposed about the exterior surface and parallel to a longitudinal axis of the exterior surface.

According to an embodiment, the bracelet further comprises: an ornamental charm comprising an electrical component, wherein the charm is configured to engage the exterior surface and to contact the first conductive rail and the second conductive rail such that the electric component derives power from the voltage between the first conductive rail and the second conductive rail.

According to an embodiment, an interior surface of the charm is configured to at least partially enclose and slidingly engage the exterior surface.

According to an embodiment, the ornamental charm is configured to rotationally lock when engaged with the exterior surface.

According to an embodiment, the interior surface defines at least a first groove and a second groove, wherein the first groove is positioned and configured to receive the first conductive rail and the second groove is positioned and configured to receive the second rail, wherein the electric component is operatively connected to the first groove and the second groove to derive power from the first rail and the second rail when the charm is engaged with the exterior surface.

According to an embodiment, the charm comprises a first prong configured to grasp an interior wall of a first channel defined by the exterior surface and contact the first conductive rail disposed within the first channel; and a second prong configured to grasp an interior wall of a second channel defined by the exterior surface and contact the second conductive rail disposed within the second channel.

BRIEF DESCRIPTION OF THE DRAWINGS

The various embodiments described herein will be better understood in conjunction with the following figures:

FIGS. 10A, 10B, and 10C show a perspective view and cross section view of charm according to an embodiment;

DETAILED DESCRIPTION

Figure 1:
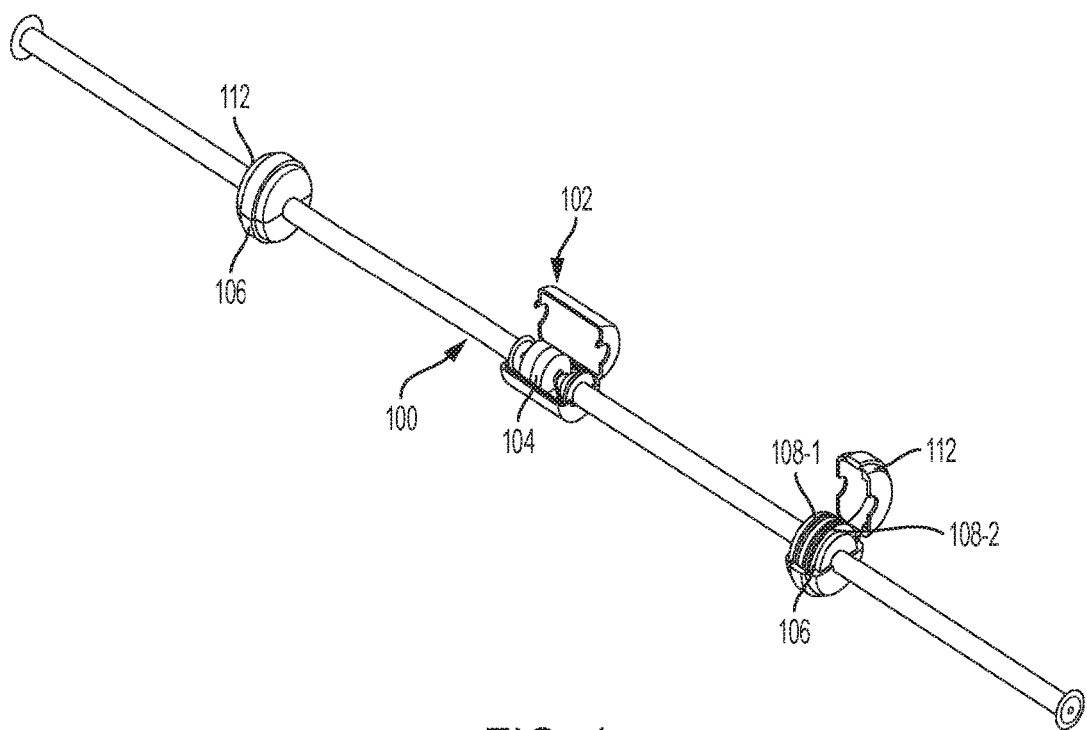
FIG. 1 shows a perspective view a bracelet according to an embodiment.

Referring now to the figures, wherein like reference numerals refer to like parts throughout, there is seen a powered bracelet according to an embodiment. Referring first to FIG. 1, there is seen a bracelet 100 in accordance with an embodiment. Bracelet 100 has a battery pack 102, containing a battery 104. Bracelet 100 further comprises a locator 106, having two exposed rails, 108-1 and 108-2, which circle the exterior of locator 106. Each rail is operatively connected to an opposing terminal of battery 104, such that rail 108-1 is charged with the potential of one terminal of battery 104 and rail 108-2 is charged with the potential of the other terminal of battery 104. Accordingly, a potential difference exists between the rails. The rails, in an embodiment, are operatively connected to battery 104 via wires (not shown), housed within a conduit formed by the exterior walls of bracelet 100. (Although bracelet 100 is depicted here as straight, one of ordinary skill will recognize that bracelet 100 is, in an embodiment, curved into a loop). FIG. 1 further shows a decorative casing 112, containing at least one electrical component, such as an LED. Decorative casing 112 is attachable to locator 106 such that the electrical component may come into contact with both rails. Because a potential difference exists between the rails, any component, such as an LED, in contact with the rails, may derive power. In this way, the locator forms a knuckle, which may receive power and provide power, through rails 108-1 and 108-2, to attachable electric components.

Although a bracelet is depicted in FIG. 1, and referred to throughout, one of ordinary skill in the art will appreciate that any other item of jewelry that may be configured to receive a charm may be used. For example, the item of jewelry may be a necklace, earring, ring, anklet, brooch, tie clip, or pin. The item of jewelry may be flexible, such as a flexible bracelet, or may be inflexible, such as a bangle.

The item of jewelry may be rubber, metal, plastic, or any other material suitable for forming jewelry. For example, the jewelry may be formed from a woven band, the threads formed from metals, rubber, or organic matter such as cotton. Alternately, the jewelry may be formed from a band made of solid metal, rubber, plastic or a composite material. In one embodiment, the jewelry is formed from a self-healing rubber material, which could be reformed when torn or otherwise cut.

Figure 2:
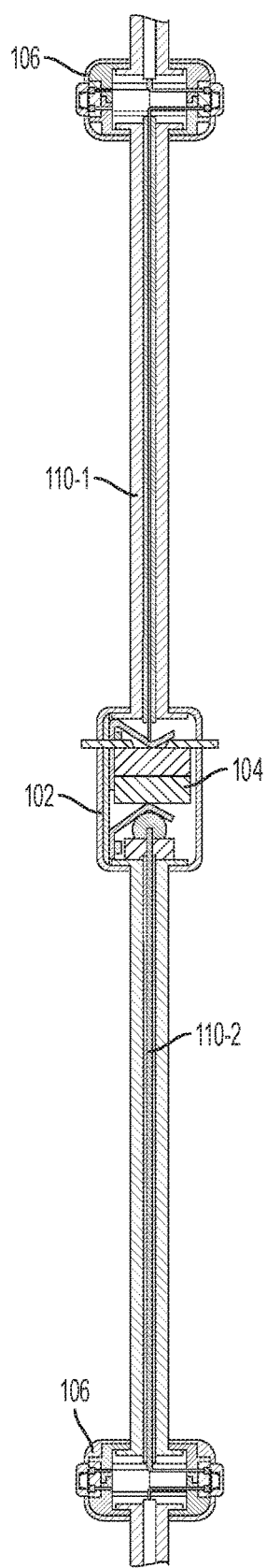
FIG. 2 shows a schematic of a bracelet according to an embodiment.

FIG. 2 shows a schematic view of bracelet 100 according to an embodiment. As shown in this view, rail 108-2 is in communication with one terminal of battery 104 via wire 110-1 and rail 108-1 is in communication with the opposing terminal of battery 104 via wire 110-2. As shown, wires 110-1 and 110-2 extend outwardly from the opposing terminals of battery 104. Although not depicted in FIG. 2, these wires may circle around, overlapping for at least a portion of the bracelet. Indeed, it is necessary that both wires run to each locator, such that both rails may be powered. In an alternate embodiment, the wires 110-1 and 110-2 may both extend down the same side of bracelet 100 (band) instead of opposing sides of bracelet 100.

Figure 3:
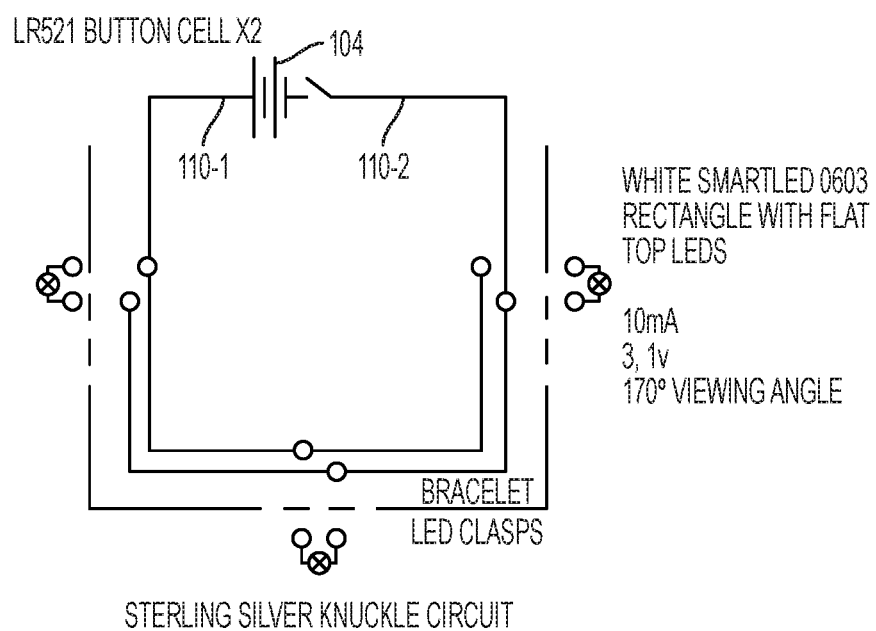
FIG. 3 shows circuit schematic of a bracelet according to an embodiment.

FIG. 3 shows a circuit diagram of bracelet 100 according to an embodiment. Wires 110-1 and 110-2 may extend to at least one locator (the wires of the circuit shown in FIG. 3 extend to three locators). The rails of each locator are represented by dots in FIG. 3. Any component attached across the rails will thus be in parallel to any other component attached to the same rails or to a different set of rails. In an alternate embodiment, and as will be appreciated by a person of ordinary skill, the rails may be configured to attach components in series rather than in parallel.

As described above, rails 108-1 and 108-2 are individually charged at different potentials. One of ordinary skill will appreciate that as long as a potential difference exists between the rails, a charm in contact with both rails may derive power from the rails. Although the term rails is used, one of ordinary skill in the art will appreciate, and as will be apparent from the several embodiments described herein, that the rails may take on any form sufficient for communicating power to a charm. The rails, in a simple embodiment, may be an exposed wire. In an alternate embodiment, the rails may be formed from a conductive o-ring. In yet another embodiment, the exterior of a bangle may be charged and form one of the rails.

Figure 4A:
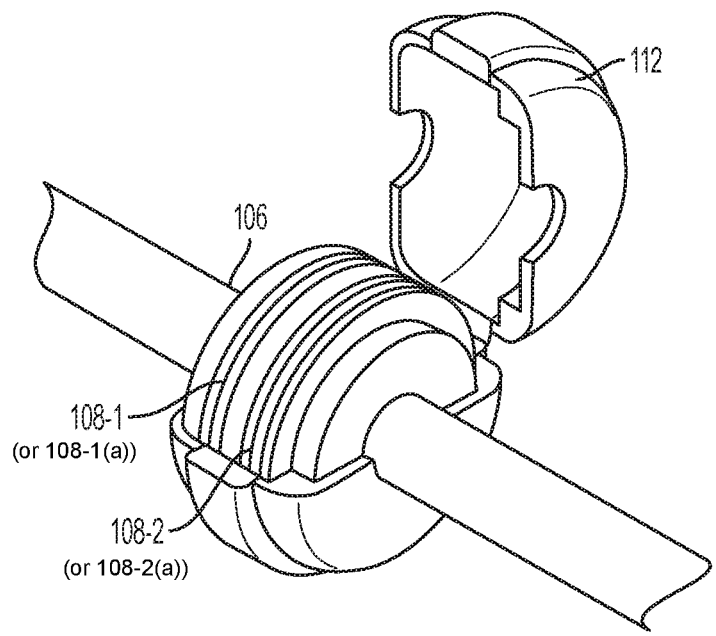
FIGS. 4A and 4B show a perspective view and a schematic of a locator according to an embodiment.
Figure 4B:
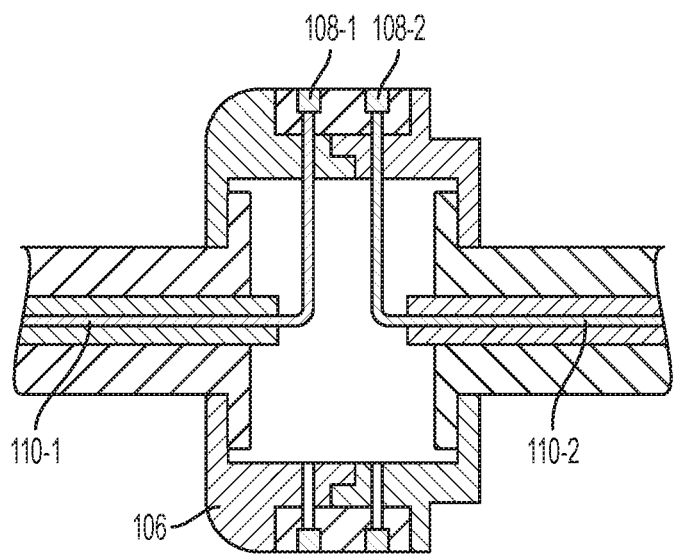

Referring now to FIGS. 4A and 4B a perspective and schematic view of a locator 106 is shown, respectively. As shown in FIG. 4a rails 108-1 and 108-2 on locator may be implemented as grooves or channels that circle around the entire of exterior of locator 106. Alternately, the rails may only extend around a portion of locator 106. The rails may have some form of conductive material forming the walls of the channel, such that any charm in contact with the walls of the channel may receive power. Alternately, the rails may have conductive material set within the channels, such as in the form of a conductive o-ring 108-1(a), 108-2(a) or exposed wire. One of ordinary skill will appreciate that rails 108-1, 108-2 may take any form suitable for receiving and power an electrical component. In this way, rails 108-1, 108-2 may take forms other than channels. For example, the rails may protrude as a rigid piping, upon the exterior of locator 106. In yet another embodiment, the rails may be flat conductive sections of the exterior surface of locator 106. Alternately, the rails may exist as simple holes, formed in the exterior of locator 106, which may receive the connectors of any component.

FIG. 4B shows a schematic view of locator 106. Locator 106 may be formed from an insulating material, such as plastic, rubber, or ceramic. Locator 106 may receive at least two sections of bracelet 100 and consequently, each wire 110-1 and 110-2, located within bracelet 100. Bracelet 100 may be fixed within locator 106 via a splayed or riveted end and held together by the housing of locator 106. As will be appreciated by a person of ordinary skill, the locator exterior may take on any shape, and thus may be semi-cylindrical, cylindrical, spherical, etc.

FIGS. 5A, 5B, 5C, and 5D show varying perspectives of decorative casing 112. As shown in FIG. 4A, decorative casing 112 may be outfitted with a hinge, such that it may clip around locator 106. Decorative casing 112 may take on any number of shapes. In one embodiment, decorative casing 112 may cover the entirety of locator 106. In an alternate embodiment, decorative casing 112 may only cover a portion of locator 106. In the embodiment shown, decorative casing may have a hinge such that it may be opened and fitted upon locator 106. In alternate embodiment, it may be snapped to locator 106, or fixed in any other way as will be appreciated by a person of ordinary skill.

Figure 5A:
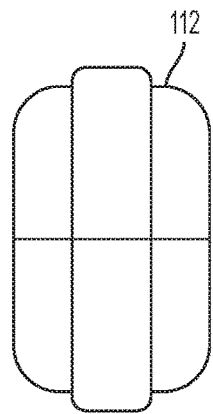
FIGS. 5A, 5B, 5C, and 5D show various perspective views and a schematic of decorative casing according to an embodiment.
Figure 5B:
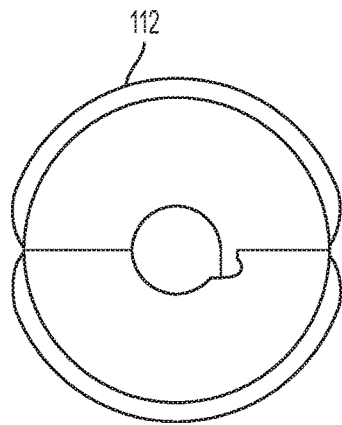
Figure 5C:
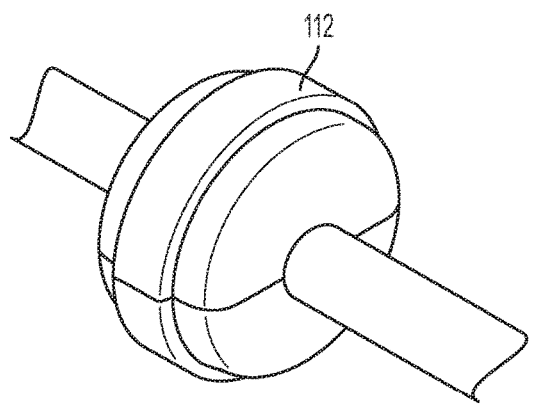
Figure 5D:
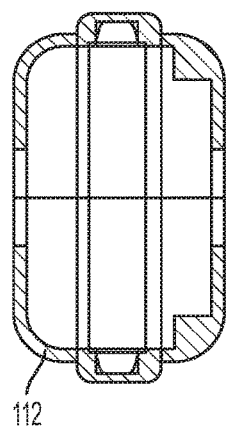

FIG. 5D shows a schematic view of decorative casing 112. Decorative casing may have one or more electrical components 116, configured to contact rails 108-1 and 108-2 when decorative casing 112 is attached to locator 106. When the one or more electrical components 116 are in contact with rails 108-1 and 108-2, they may be powered. In an embodiment, the electrical components 116 are LEDs, however, one of ordinary skill will appreciate that any electrical component may be used. Decorative casing 112 may comprise a light guide material to cover each LED and to increase light dispersion efficacy from the single point source.

Decorative casing may have any number of electrical components and perform a variety of functions. For example, the charms may have an LED or other light source, adapted to illuminate upon receiving power from the rails. Alternately, the charms may have small motors, or speakers, configured to spin an ornament or play music. One of ordinary skill in the art will appreciate that as technology advances, the capabilities of the charms may increase.

Figure 6A:
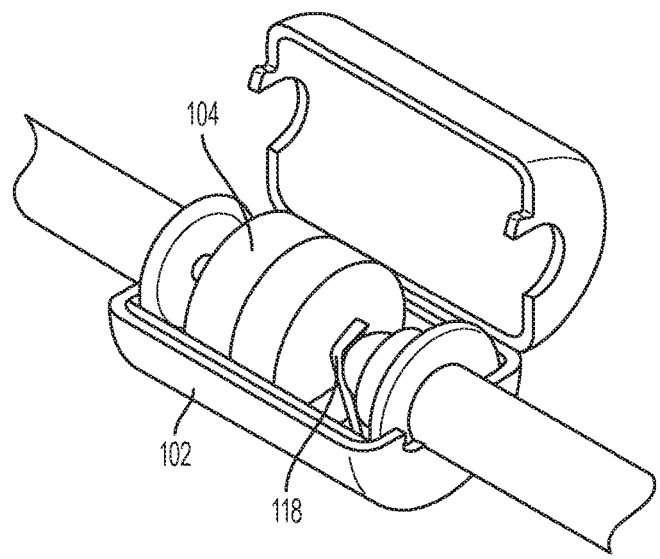
FIGS. 6A, 6B, show a perspective view and a schematic of a battery case according to an embodiment.
Figure 6B:
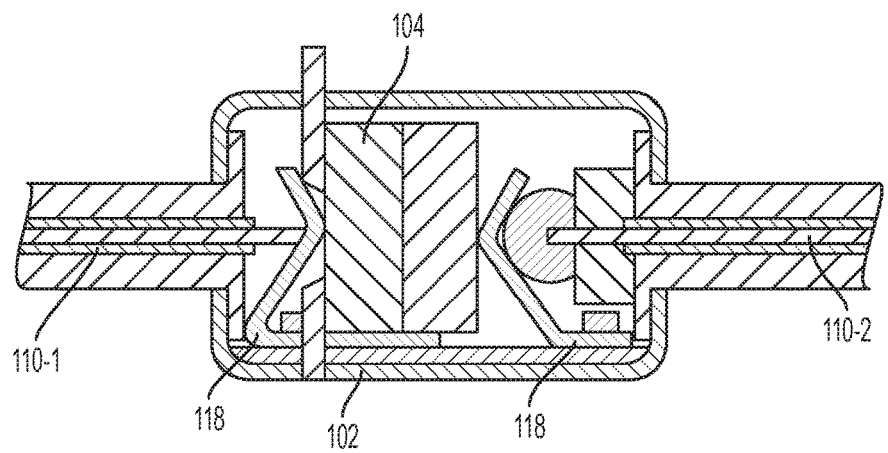

FIGS. 6A and 6B, show a perspective view and a schematic view of an embodiment of battery case 102, respectively. As shown in the FIG. 6B, battery case may contain one or more cell batteries in an internal compartment. The batteries 104 may be held in either side by a spring loaded terminal clip 118. Terminal clip 118 may be operatively connected to wires 108-1 and 108-2. One of ordinary skill in the art will appreciate that any number of contacts may be used to receive power from the batteries 104. A push-through switch, or other kind of switch, may be used to turn bracelet 100 on or off. In the push-through switch embodiment, the push-through switch interrupts contact with the terminals 118 to deprive power to the wires 108-1 and 108-2.

Figure 7:
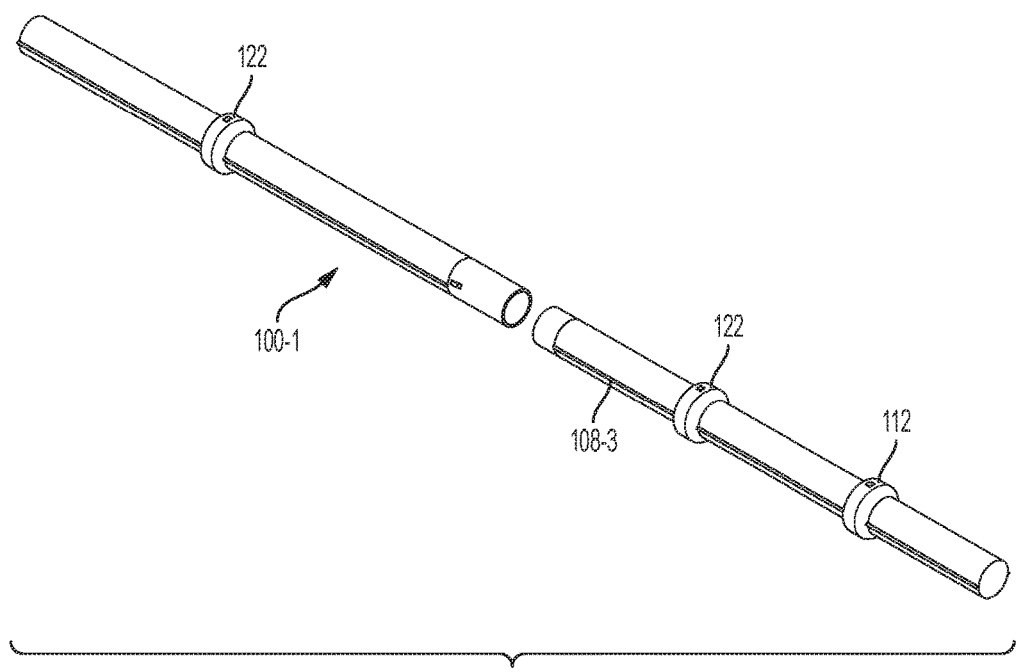
FIG. 7 shows a perspective view of a bracelet according to an embodiment.

Turning now to FIG. 7, there is shown an alternate embodiment of bracelet 100. In this embodiment, bracelet 100-1, the powered rails extend the length of bracelet 100-1, individually isolated from the bracelet substrate, instead of being formed in periodically positioned knuckles. As shown, charms 122 may slide over bracelet 100-1, and receive power from the rails at any position, such that they may move freely across the band. In this way, charms may be placed in ad hoc positions instead of fixed intervals. Bracelet 100-1 may also have a clasp mechanism 120 for opening and closing the band.

Figure 8:
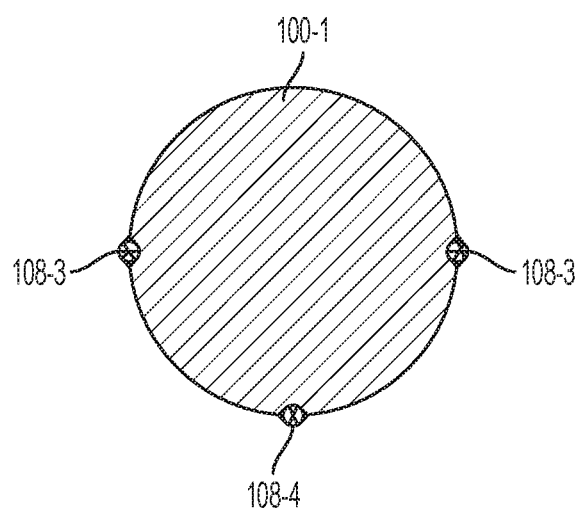
FIG. 8 shows a cross section of a bracelet according to an embodiment.

FIG. 8 shows a cross-section view of bracelet 100-1. A shown, each rail 108-3, 108-4, may be fixed to the external portion of bracelet 100-1, such that the rails are individually separated from each other. In the embodiment shown, there are two positive tracks, and one negative track. One of ordinary skill in the art will appreciate that only two are required, however any number may be used. For example, three may be used to ensure that the charm may function in any configuration, as the positive rails are duplicated to allow for constant connection to the charm 122 regardless of the rotational orientation of charm 122. In an alternate embodiment, the rails may be formed as channels or depressions in bracelet 100-1. In yet another embodiment, the rails may be flat conductive portions of the surface of bracelet 100-1, tracks submerged in bracelet 100-1.

Bracelet 100-1 may be formed of any material suitable for forming a bracelet. In one embodiment, it is made of flexible rubber (such as self-healing rubber), plastic, or fabric. In an alternate embodiment, it is formed from metal, which may be woven, such as a chain, or solid such as bangle. Certain frictive materials may hold charm 122 in place once it has been manually positioned on bracelet 100-1 by a user.

Figure 9:
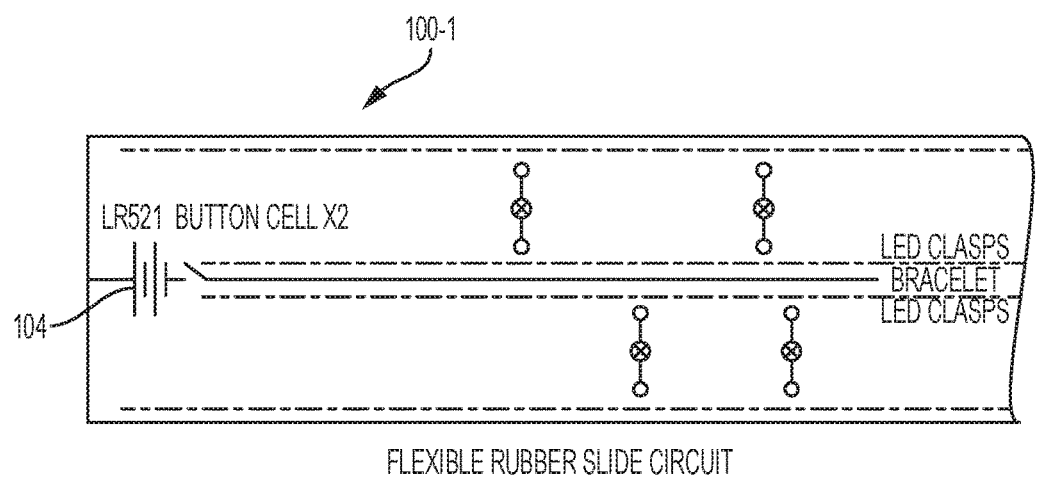
FIG. 9 shows a circuit schematic of a bracelet according to an embodiment.

FIG. 9 shows a circuit schematic of bracelet 100-1. As shown, multiple LED's or other electrical components attach to battery 104 in parallel with one another. When no LEDs are attached, the circuit remains open and no current flows. It is clear in this view that the components may slide freely around the band and always maintain contact with the rails.

FIGS. 10A, 10B and 10C show a perspective view, cross-sectional, and transparent side-view of an ornamental charm 122. In this embodiment, charm 122 is toroidal and may slide freely over the rails located on the band of bracelet 100-1. In alternate embodiments, charm 122 may be spherical, cylindrical, or any other formable shape. In an embodiment, charm 122 is formed as a solid object that slides over bracelet 100-1 via a hole in charm 122. In an alternate embodiment, it may clip to bracelet 100-1, in a way to similar to locator 106, or may be attached in any other way as will be appreciated by a person of ordinary skill in the art.

As shown in FIG. 10B, in an embodiment, ornamental charm 122 may have contacts, formed as grooves within the inner walls of charm 122 such that charm 122 may fit over rails 108-3 and 108-4 and rotationally lock. Where the rails are formed as channels or depressions, charm 122 may have a complementary structure such that charm 122 may fit within the recessed rails and rotationally lock into place. In an embodiment, the charm contacts may be spring loaded, allowing for continuous contact to the rails. The architecture of the conductive circuit surrounding, whether precious metal, rubber or other material would be shaped or keyed to help the orientation of the charm, as well as continuous contact. The charm may be attached at a suitable tension where it would remain stable under its own weight, but be able to move freely a user pinching with manually positioning (such as by pinching with two fingers).

Charm 122 may have any number of electrical components that derive power from the rails. For example, charm 122 may have an LED 124 as shown in FIG. 10B. Charm is structured such that any components are operatively connected to rails 108-3 and 108-4. This may accomplished by submerging wires in charm 122 that are communication with rails 108-3 and 108-4, when the charm 122 is attached to bracelet 100-1.

Figure 11A:
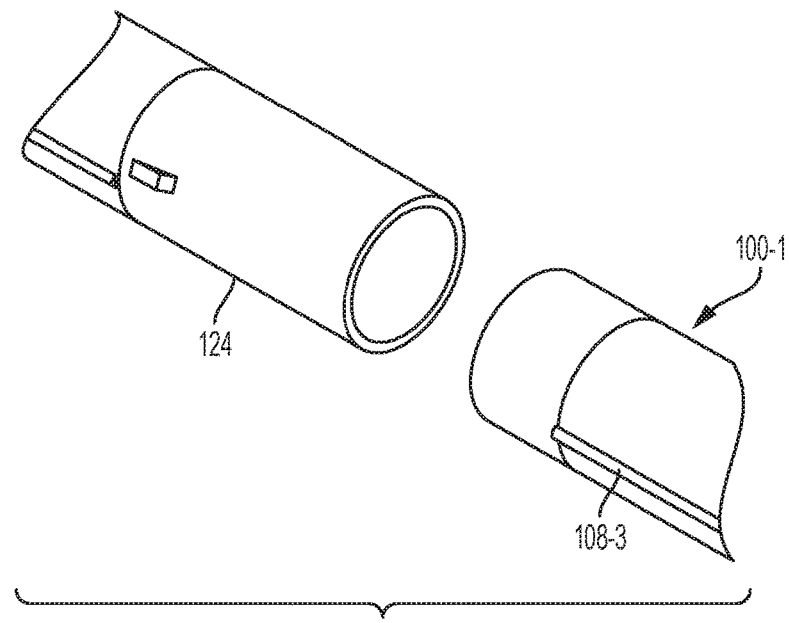
FIGS. 11A and 11B show a perspective view and a schematic of a clasp according to an embodiment.
Figure 11B:
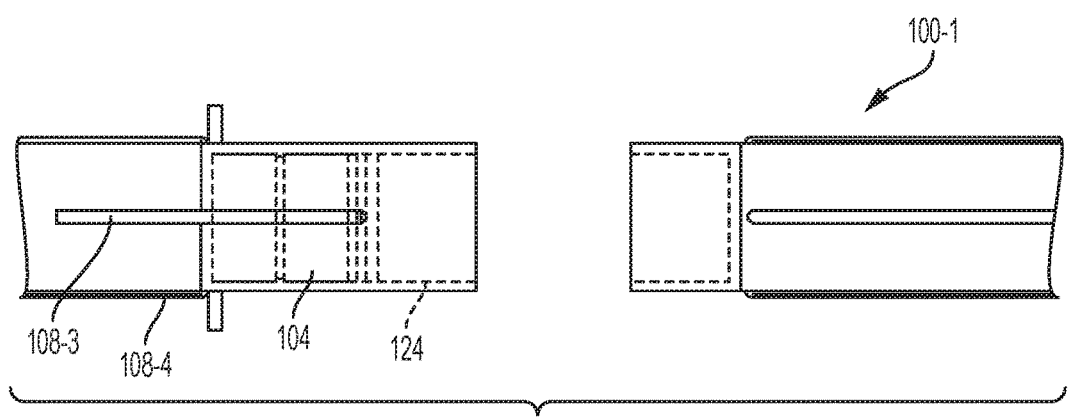
Figure 12A:
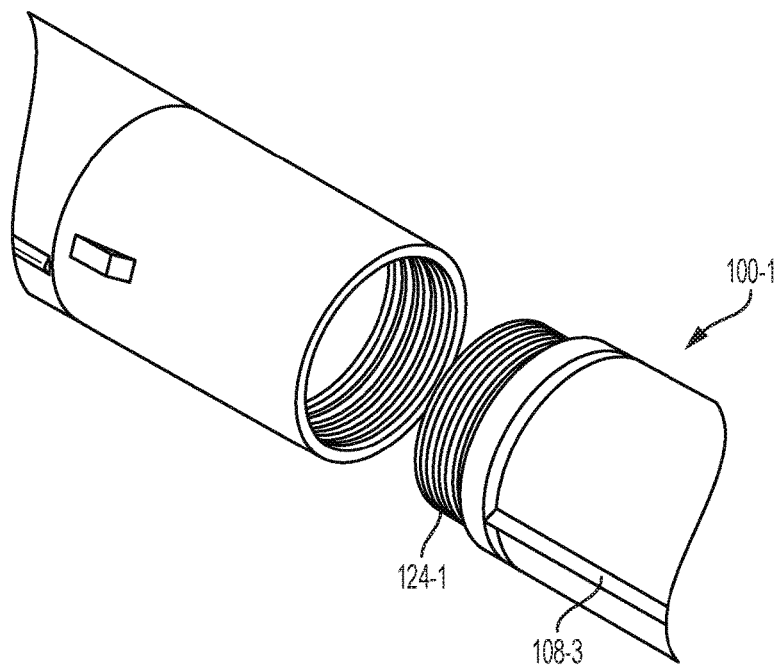
FIGS. 12A and 12B show a perspective view and a schematic of a clasp according to an embodiment.
Figure 12B:
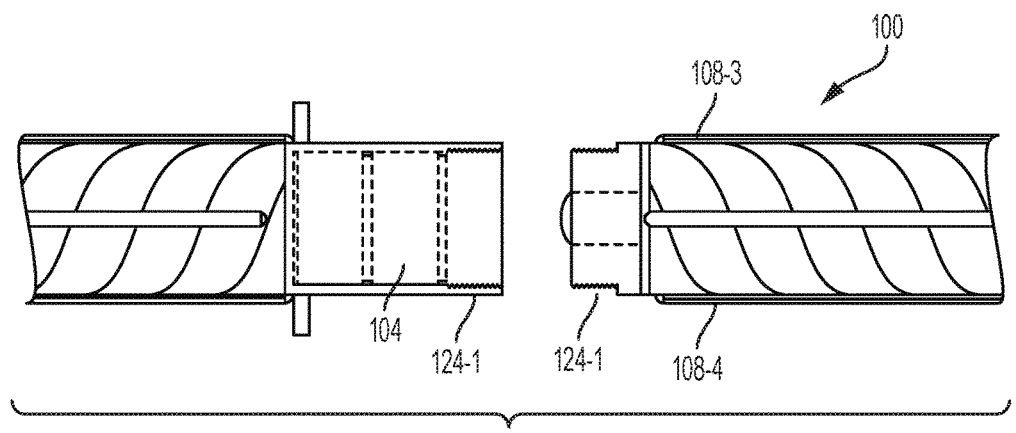

As shown in FIG. 11A and FIG. 11B and FIGS. 12 A and 12B there are shown alternative embodiments of a clasp 120 for opening and closing bracelet 100-1 (they may also be used to in 100). As shown in FIGS. 11A and 11B, the clasp 120-1 may be magnetic, and isolated from battery 104. In the embodiments shown in 12A and 12B, the claps may have a threaded closure 120-2 instead of a magnetic clasp 120-1. One of ordinary skill in the art will recognize that any closure suitable for closing the bracelet may be used. In an alternate embodiment, bracelet 100-1 may be formed from a resilient material, such that it resists opening and closes when a user ceases to hold it open.

In addition to the embodiments described above, the charms may be configured to dangle, via a wire, a plurality of wires, or a chain, from the rails of bracelet 100 and 100-1. In this embodiment, the charm may be configured to hook into a channel, or into multiple channels, the channel or channels being charged. For example, each charm may have a set of prongs which insert into a set of oppositely charged channels, and expand to grasp the walls of the channels. In another embodiment, the charm is configured to snap on to a charged snap. In another embodiment, the charm may take the form of a link such as seen in Italian charm bracelets, with each tongue attaching to a rail or charged portion of the bracelet. In yet another embodiment, the charm may attach to the jewelry by means of a clasp, such as a claw, toggle, stringing, hook, hook-and-eye, barrel, folder-over, etc. In each of these embodiments, the clasp may be adapted to contact both rails or a terminal that is charged by the rails in order to receive power.

In another embodiment, bracelet 100 (or 100-1) may include at least one interface point for communicating with an external device. The interface point, in an embodiment, may include an antenna, FR transceiver, or other device suitable for allowing bracelet 100 to communicate with an external device. Interface point may further comprise hardware, firmware, software—such as a processor in communication with memory storing program instructions for executing the communication and other features—or some combination of those, to enable bracelet to communicate with an external device over a known or custom communications protocol including but not limited to ZigBee standards-based protocol, Bluetooth technology, and/or Wi-Fi technology. The external device may be a wearable such as a smart watch, a mobile device such as a smart phone or tablet, a laptop, a desktop, server, or any other computing device as will be apparent to a person of ordinary skill in conjunction with a review of this disclosure. In an embodiment, bracelet 100 may include up to four interface points, although in alternate embodiments, any number may be included.

What is claimed is:

1. A bracelet, comprising:
   a battery having a first terminal and a second terminal;
   a first conductive rail in electrical communication with the first terminal of the battery;
   a second conductive rail in electrical communication with the second terminal of the battery, such that a voltage exists between the first conductive rail and the second conductive rail;
   an exterior surface configured to attachably receive an electrical component such that the electrical component is in contact with and receives power from the first conductive rail and the second conductive rail;
   wherein the first rail is disposed within a first channel defined by the exterior surface and the second rail is disposed within a second channel defined by the exterior surface and the first conductive rail and the second conductive rail each comprise an electrically conductive O-ring.

2. The bracelet of claim 1, wherein the electrical component is a light emitting diode and the received power is sufficient to activate the light emitting diode.

3. The bracelet of claim 1, wherein the first conductive rail and the second conductive rail each comprise a rigid electrically conductive piping.

4. The bracelet of claim 3, wherein the first conductive rail and the second conductive rail are each disposed on the exterior surface.

5. The bracelet of claim 1, wherein the first conductive rail and the second conductive rail are disposed on a knuckle defined by the exterior surface.

6. The bracelet of claim 5, further comprising a casing configured to at least partially enclose the knuckle defined by the exterior surface.

7. The bracelet of claim 6, wherein the casing further comprises a light guide configured to diffuse light generated by the electrical component.

8. The bracelet of claim 1, further comprising a magnetic clasp.

9. The bracelet of claim 1, wherein the exterior surface is defined by a self-healing rubber.

10. The bracelet of claim 1, further comprising an interface point configured to communicate with an external computing device.

11. The bracelet of claim 10, wherein the interface point comprises an antenna configured to transmit and receive at a frequency suitable for short-range communication.

12. The bracelet of claim 1, wherein the first conductive rail and the second conductive rail are disposed about the exterior surface and parallel to a longitudinal axis of the exterior surface.

13. The bracelet of claim 1, further comprising:
   an ornamental charm comprising an electrical component, wherein the charm is configured to engage the exterior surface and to contact the first conductive rail and the second conductive rail such that the electric component derives power from the voltage between the first conductive rail and the second conductive rail.

14. The bracelet of claim 13, wherein an interior surface of the charm is configured to at least partially enclose and slidingly engage the exterior surface.

15. The bracelet of claim 14, wherein the ornamental charm is configured to rotationally lock when engaged with the exterior surface.

16. The bracelet of claim 15, wherein the interior surface defines at least a first groove and a second groove, wherein the first groove is positioned and configured to receive the first conductive rail and the second groove is positioned and configured to receive the second rail, wherein the electric component is operatively connected to the first groove and the second groove to derive power from the first rail and the second rail when the charm is engaged with the exterior surface.

17. The bracelet of claim 14, wherein the charm comprises
   a first prong configured to grasp an interior wall of a first channel defined by the exterior surface and contact the first conductive rail disposed within the first channel; and
   a second prong configured to grasp an interior wall of a second channel defined by the exterior surface and contact the second conductive rail disposed within the second channel.

18. A bracelet, comprising:
   a battery having a first terminal and a second terminal;
   a first conductive rail in electrical communication with the first terminal of the battery;
   a second conductive rail in electrical communication with the second terminal of the battery, such that a voltage exists between the first conductive rail and the second conductive rail;

an exterior surface configured to attachably receive an electrical component such that the electrical component is in contact with and receives power from the first conductive rail and the second conductive rail; and an ornamental charm comprising an electrical component, wherein the charm is configured to engage the exterior surface and to contact the first conductive rail and the second conductive rail such that the electric component derives power from the voltage between the first conductive rail and the second conductive rail.

19. The bracelet of claim 18, wherein an interior surface of the charm is configured to at least partially enclose and slidingly engage the exterior surface.

20. The bracelet of claim 19, wherein the ornamental charm is configured to rotationally lock when engaged with the exterior surface.

21. The bracelet of claim 20, wherein the interior surface defines at least a first groove and a second groove, wherein the first groove is positioned and configured to receive the first conductive rail and the second groove is positioned and configured to receive the second rail, wherein the electric component is operatively connected to the first groove and the second groove to derive power from the first rail and the second rail when the charm is engaged with the exterior surface.

22. The bracelet of claim 19, wherein the charm comprises a first prong configured to grasp an interior wall of a first channel defined by the exterior surface and contact the first conductive rail disposed within the first channel; and a second prong configured to grasp an interior wall of a second channel defined by the exterior surface and contact the second conductive rail disposed within the second channel.

* * * * *